Patented Nov. 5, 1940

2,220,624

UNITED STATES PATENT OFFICE 2,220,624

PROCESS FOR THE HYDROGENATION OF LIGNIN AND WASTE PULP LIQUORS AND THE PRODUCTS THEREOF

Earl C. Sherrard and Elwin E. Harris, Madison, and Jerome F. Saeman, Cross Plains, Wis., assignors to Henry A. Wallace, Secretary of Agriculture of the United States of America, and to his successors in office No Drawing. Application July 15, 1939, Serial No. 284,750

19 Claims. (Cl. 260—124)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for Governmental purposes, without the payment to us of any royalty thereon.

Our invention relates to the process for the hydrogenation and/or hydrogenolysis of lignin, and to the products resulting therefrom. The process comprises the treatment of a solution and/or suspension of lignin in water, neutral or alkaline, and in the presence of a catalyst, such as, for example, nickel, palladium, platinum, or molybdenum, with hydrogen at elevated pressures and temperatures, for the purpose of converting lignin into heterogeneous products comprising methanol, n-propylcyclohexane, and its derivatives, organic acids, and high-boiling resins.

The principal object of our invention is to convert lignin by hydrogenation and/or hydrogenolysis into useful products by using an inexpensive and easily obtained solvent or suspending medium, such as water.

Still other objects of our invention are to accelerate the reaction of hydrogen and to allow relatively large concentrations of lignin to be employed.

Still other objects of our invention are the production of useful products, such as, for example, methanol, alkali-soluble organic acidic materials, n-propylcyclohexane and its derivatives, and water-insoluble resins.

Still further objects of our invention consist in controlling the amounts of the various products formed.

Other objects will appear from the following description of the embodiments of our invention.

Other investigators (Swedish Patents No. 69,897, November 17, 1928, and No. 71,006, October 5, 1928) employ concentrated pulp liquor, or lignin precipitated from pulp liquor, in acid solution at temperatures above 300° C., for the purpose of obtaining hydrocarbons, phenols, and other aromatic compounds.

Our invention is not to be confused with the aforementioned teachings because, according to our process, the lignin is not subjected to temperatures above 300° C., nor do we employ an acid solution. Furthermore, the products obtained by our process comprise a mixture of aliphatic and hydroaromatic compounds.

In U. S. Patent No. 2,146,655, granted February 7, 1939, there is taught the purification of lignin, and the use of organic solvents or suspending agents, for the purpose of keeping the lignin in solution or suspension during the hydrogenation.

Our invention differs from the teachings of the aforementioned patent, in that in this process we are not concerned with purification or use of purified lignin, or the use of organic solvents; further, we prefer the use of water, or an aqueous alkaline solution, as our solvent or suspending medium.

Our process preferably consists in the solution and/or suspension of lignin, or lignin derivatives, in water, either neutral or alkaline, and subjecting it to the action of hydrogen, in the presence of a suitable catalyst, at elevated pressures, and temperatures not exceeding 300° C., and subjecting the mass to agitation for a suitable period of time.

We may employ lignin, or lignin derivatives obtained from the liquors resulting from the sulphite, sulphate, soda, or other pulping processes; or lignin derived or obtained from any source whatsoever. We may also employ whole raw pulping liquor, without any isolation of lignin, such as is obtained in the so-called soda-pulping process, in which case we obtain, in addition to the hydrogenated products obtained from lignin, hydrogenated products resulting from the nonligneous materials contained in these liquors.

We have found that by the use of a neutral solution, and/or suspension that the resulting product contains a low percentage of water-soluble acidic materials, and that by the addition of increasing amounts of alkali, the amount of acidic materials is increased with a corresponding decrease of the water-insoluble resinous compounds.

The following examples may serve to illustrate the conditions we preferably may employ in performing our process:

*Example 1.*—Take approximately 150 grams lignin prepared from wood by the action of methanol-containing hydrochloric acid and suspend in 800 to 950 grams of water; place this in a 2-liter bomb with substantially 10 grams of a suitable catalyst such as, for example, nickel, and introduce hydrogen at substantially 2,000 pounds per square inch pressure at room temperature; agitate the mixture, the while heating at temperatures below 300° C., for from 2 to 6 hours, or until the desired amount of hydrogen is absorbed.

Some of the products obtained from the abovementioned example are water soluble, and others are water insoluble, thereby forming two layers. The methyl alcohol formed during the reaction may be recovered, by any well-known technique, from the aqueous layer. After this is accomplished the aqueous residue will be found to contain a minimum of acidic substances. The oily, or water-insoluble material, containing propylcyclohexane derivatives, such as n-propylcyclohexane, p-n-propylcyclohexanol, p-n-propylcyclohexanediol 1-2,3-p-hydrocyclohexanolpropanol-1, and resins, may be fractionally distilled, under diminished pressure, into its component parts.

*Example 2.*—Take approximately 150 grams of lignin; suspend in 800 to 950 grams of water, and add substantially 0.5 gram of sodium hydroxide; place in a 2-liter bomb with substantially 10 grams of a suitable catalyst such as, for example, nickel; introduce hydrogen at substantially 2,000 pounds per square inch pressure, at room temperature; agitate the mixture, the while heating at temperatures below 300° C., for from 2 to 6 hours, or until the desired amount of hydrogen is absorbed.

The resulting products obtained by the mild alkaline method outlined in this example, while substantially the same as those obtained in Example 1, contain in the aqueous layer besides the methyl alcohol, a larger proportion of acidic materials. These acidic materials may be recovered from the aqueous layer by any well-known method. The resinous content is proportionally reduced by the production of these acidic materials. The other products of the reaction are recovered in the manner outlined in Example 1.

*Example 3.*—Take approximately 150 grams of lignin; suspend in 800 to 950 grams of water, and add substantially 50 grams of sodium hydroxide; place in a 2-liter bomb with substantially 10 grams of a suitable catalyst such as, for example, nickel; introduce hydrogen at substantially 2,000 pounds per square inch pressure, at room temperature; agitate the mixture, the while heating at temperatures below 300° C., for from 2 to 6 hours, or until the desired amount of hydrogen is absorbed.

The resulting products obtained by the use of a greater alkalinity as outlined in this example, while substantially the same as those obtained in Example 2, comprise a still larger proportion of acidic compounds; i. e., the amount of acidic materials in the aqueous layer are considerably increased, while the water-insoluble resins are correspondingly reduced. The other products of the reaction are recovered in the manner outlined in Example 1.

*Example 4.*—Place approximately 1 liter of raw pulping liquor, resulting from any well-known pulping process, such as the soda process, in a 2-liter bomb with a suitable catalyst; introduce hydrogen at substantially 2,000 pounds per square inch pressure, at room temperature; agitate the mixture, the while heating at temperatures below 300° C. for from 2 to 6 hours, or until the desired amount of hydrogen is absorbed.

In the event a raw pulping liquor, obtained from an acid-pulping process, is employed, its acidic character should first be modified by the addition of alkali.

The resulting products will be substantially the same as those obtained in Example 3. However, in addition to the products obtained from the hydrogenation of lignin, products from the non-ligneous constituents of this pulp liquor will also be obtained, which will be different from the hydrogenated products obtained from lignin. These will comprise various aliphatic alcohols and glycols, instead of cyclohexane derivatives, obtained from lignin.

It is to be understood that we do not limit ourselves to any given gas pressure during the hydrogenation reaction. We prefer to allow the reacting gas pressure to be governed by the initial gas pressure introduced into the bomb, and at a chosen temperature. We have, by our examples, shown what we consider to be the optimum temperature and pressure. We recommend temperatures below 300° C. in order to avoid thermal decomposition of the lignin, but it is to be understood that we do not wish to limit ourselves to temperatures below 300° C., provided conditions are employed that will avoid thermal decomposition of the lignin.

Our invention may also be practiced as a continuous process under pressure in towers or tubes by the introduction of hydrogen against a counterflow of lignin.

By the expressions suitable catalyst, elevated pressures, and aqueous medium, we mean that the catalyst may be nickel, palladium, platinum, or molybdenum; and, elevated pressures, pressures ranging initially from 1,500 to 3,000 pounds per square inch at room temperature, and that during the reaction will correspond to pressures ranging from 3,000 to 6,000 pounds, depending upon the temperature employed; and, aqueous medium to include both neutral and alkaline solutions.

Having thus described our invention, what we claim for Letters Patent is:

1. A process for the catalytic hydrogenation and hydrogenolysis of one of a group consisting of an aqueous suspension of lignin and waste pulp liquors, not acid in reaction, which comprises subjecting said mixture to the action of hydrogen in the presence of a catalyst selected from the group consisting of nickel, palladium, platinum, and molybdenum, at elevated pressures, and at temperatures not exceeding 300° C., until the desired amount of hydrogen is absorbed, the while agitating the mass.

2. A process for the production of heterogeneous products, comprising methanol, n-propylcyclohexane and its derivatives, and organic acidic materials, resulting from the catalytic hydrogenation of lignin, which comprises subjecting lignin in an aqueous medium to the action of hydrogen in the presence of a catalyst selected from the group consisting of nickel, palladium, platinum, and molybdenum, at elevated pressures, and at temperatures not exceeding 300° C. until the desired amount of hydrogen is absorbed; and thence separating and recovering the heterogeneous reaction products.

3. A process for the production of methanol, resulting from the catalytic hydrogenation and hydrogenolysis of lignin, which comprises suspending lignin in an alkaline aqueous medium; thence subjecting the mixture to the action of hydrogen in the presence of a catalyst selected from the group consisting of nickel, palladium, platinum, and molybdenum, at elevated pressures, and at temperatures not exceeding 300° C.; and thence separating the methanol from the aqueous medium and other reaction products by distillation.

4. A process for the production of methanol, resulting from the catalytic hydrogenation and hydrogenolysis of lignin contained in non-acid waste pulp liquors, which comprises subjecting the mixture to the action of hydrogen in the presence of a catalyst selected from the group consisting of nickel, palladium, platinum, and molybdenum, at elevated pressures, and at temperatures not exceeding 300° C.; and thence separating the methanol, from the aqueous medium and other reaction products, by distillation.

5. A process for the production of n-propyl-cyclohexane and its derivatives, resulting from the catalytic hydrogenation and hydrogenolysis of lignin, which comprises suspending lignin in an alkaline aqueous medium; thence subjecting the mixture to the action of hydrogen in the presence of a catalyst selected from the group consisting of nickel, palladium, platinum, and molybdenum, at elevated pressures, and at temperatures not exceeding 300° C.; thence recovering the oily layer from the aqueous layer, and thence separating n-propylcyclohexane and its derivatives from the oily layer by fractional distillation under diminished pressure.

6. A process for the production of n-propyl-cyclohexane and its derivatives, resulting from the catalytic hydrogenation and hydrogenolysis of lignin contained in non-acid waste pulp liquors, which comprises subjecting the mixture to the action of hydrogen in the presence of a catalyst selected from the group consisting of nickel, palladium, platinum, and molybdenum, at elevated pressures, and at temperatures not exceeding 300° C.; thence recovering the oily layer from the aqueous layer, and thence separating n-propylcyclohexane and its derivatives from the oily layer by fractional distillation under diminished pressure.

7. A process for the production of a mixture of organic acidic materials, resulting from the catalytic hydrogenation and hydrogenolysis of lignin, which comprises suspending lignin in an alkaline aqueous medium; thence subjecting the mixture to the action of hydrogen in the presence of a catalyst selected from the group consisting of nickel, palladium, platinum, and molybdenum, at elevated pressures, and at temperatures not exceeding 300° C.; thence recovering the aqueous layer from the oily layer, and thence precipitating the organic acidic materials from the aqueous layer by acidification with an inorganic acid.

8. A process for the production of a mixture of organic acidic materials, resulting from the catalytic hydrogenation and hydrogenolysis of lignin contained in non-acid waste pulp liquors, which comprises subjecting the liquors to the action of hydrogen in the presence of a catalyst selected from the group consisting of nickel, palladium, platinum, and molybdenum, at elevated pressures, and at temperatures not exceeding 300° C.; thence recovering the aqueous layer from the oily layer, and thence precipitating the organic acidic materials from the aqueous layer by acidification with an inorganic acid.

9. A heterogeneous product, comprising methanol, n-propylcyclohexane and its derivatives, and water-insoluble resins, resulting from the catalytic hydrogenation of lignin in an aqueous medium and in the presence of a catalyst selected from the group consisting of nickel, palladium, platinum, and molybdenum, at elevated pressures, and at temperatures not exceeding 300° C.

10. A product, comprising a mixture of alkali-soluble acidic materials, resulting from the catalytic hydrogenation of one of a group consisting of an aqueous suspension of lignin and waste pulp liquors, not acid in reaction, and in the presence of a catalyst selected from the group consisting of nickel, palladium, platinum, and molybdenum, at elevated pressures, and at temperatures not exceeding 300° C.

11. A process for the catalytic hydrogenation and hydrogenolysis of lignin, which comprises introducing lignin into an aqueous medium; thence subjecting the mixture to the action of hydrogen in the presence of a nickel catalyst at elevated pressures, and at temperatures not exceeding 300° C. until the desired amount of hydrogen is absorbed; the while agitating the mass.

12. A process for the catalytic hydrogenation and hydrogenolysis of lignin contained in waste pulp liquors, which comprises subjecting alkaline waste pulp liquors to the action of hydrogen in the presence of a nickel catalyst at elevated pressures, and at temperatures not exceeding 300° C. until the desired amount of hydrogen is absorbed; the while agitating the mass.

13. A process for the production of methanol, resulting from the catalytic hydrogenation and hydrogenolysis of lignin, which comprises suspending lignin in an alkaline aqueous medium; thence subjecting the mixture to the action of hydrogen in the presence of a nickel catalyst at elevated pressures, and at temperatures not exceeding 300° C.; and thence separating the methanol from the aqueous medium and other reaction products by distillation.

14. A process for the production of methanol, resulting from the catalytic hydrogenation and hydrogenolysis of lignin contained in non-acid waste pulp liquors, which comprises subjecting the mixture to the action of hydrogen in the presence of a nickel catalyst at elevated pressures, and at temperatures not exceeding 300° C.; and thence separating the methanol, from the aqueous medium and other reaction products, by distillation.

15. A process for the production of n-propyl-cyclohexane and its derivatives, resulting from the catalytic hydrogenation and hydrogenolysis of lignin, which comprises suspending lignin in an alkaline aqueous medium; thence subjecting the mixture to the action of hydrogen in the presence of a nickel catalyst at elevated pressures, and at temperatures not exceeding 300° C.; thence recovering the oily layer from the aqueous layer, and thence separating n-propylcyclohexane and its derivatives from the oily layer by fractional distillation under diminished pressure.

16. A process for the production of n-propyl-cyclohexane and its derivatives, resulting from the catalytic hydrogenation and hydrogenolysis of lignin contained in non-acid waste pulp liquors, which comprises subjecting the mixture to the action of hydrogen in the presence of a nickel catalyst at elevated pressures, and at temperatures not exceeding 300° C.; thence recovering the oily layer from the aqueous layer, and thence separating n-propylcyclohexane and its derivatives from the oily layer by fractional distillation under diminished pressure.

17. A process for the production of a mixture of organic acidic materials, resulting from the catalytic hydrogenation and hydrogenolysis of lignin, which comprises suspending lignin in an alkaline aqueous medium; thence subjecting the mixture to the action of hydrogen in the presence of a nickel catalyst at elevated pressures, and at temperatures not exceeding 300° C.; thence recovering the aqueous layer from the oily layer, and thence precipitating the organic acidic materials from the aqueous layer by acidification with an inorganic acid.

18. A process for the production of a mixture of organic acidic materials, resulting from the catalytic hydrogenation and hydrogenolysis of lignin contained in non-acid waste pulp liquors, which comprises subjecting the liquors to the action of hydrogen in the presence of a nickel catalyst at elevated pressures, and at temperatures not exceeding 300° C.; thence recovering the aqueous layer from the oily layer, and thence precipitating the organic acidic materials from the aqueous layer by acidification with an inorganic acid.

19. A fast-flowing, alkali-insoluble, thermoplastic resinous material having a boiling point in excess of 300° C. at 1 mm. pressure, resulting from the catalytic hydrogenation of lignin in an aqueous medium in the presence of a nickel catalyst, at elevated pressures, and at temperatures not exceeding 300° C.

EARL C. SHERRARD.
ELWIN E. HARRIS.
JEROME F. SAEMAN.